(12) United States Patent
Anand et al.

(10) Patent No.: US 11,149,354 B2
(45) Date of Patent: Oct. 19, 2021

(54) DENSE ABRADABLE COATING WITH BRITTLE AND ABRADABLE COMPONENTS

(71) Applicant: General Electric Company, Schenectady, NY (US)

(72) Inventors: Krishnamurthy Anand, Bengaluru (IN); Eklavya Calla, Bengaluru (IN); Biju Dasan, Bengaluru (IN); Surinder Singh Pabla, Greer, SC (US); Priyanka Saxena, Bengaluru (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/280,283

(22) Filed: Feb. 20, 2019

(65) Prior Publication Data

US 2020/0263307 A1 Aug. 20, 2020

(51) Int. Cl.
*C23C 30/00* (2006.01)
*F01D 5/28* (2006.01)
*F01D 11/12* (2006.01)
*F01D 25/00* (2006.01)

(52) U.S. Cl.
CPC ............. *C23C 30/00* (2013.01); *F01D 5/288* (2013.01); *F01D 11/122* (2013.01); *F01D 25/005* (2013.01); *F05D 2230/90* (2013.01); *F05D 2300/17* (2013.01); *F05D 2300/2116* (2013.01); *F05D 2300/603* (2013.01); *F05D 2300/611* (2013.01)

(58) Field of Classification Search
CPC ....... C23C 30/00; F01D 25/005; F01D 5/288; F01D 11/122; F05D 2300/17; F05D 2230/90; F05D 2300/603; F05D 2300/611; F05D 2300/2116
See application file for complete search history.

(56) References Cited

U.S. PATENT DOCUMENTS

| | | | |
|---|---|---|---|
| 3,817,719 A | 6/1974 | Schilke et al. |
| 3,879,831 A | 4/1975 | Rigney et al. |
| 4,409,054 A | 10/1983 | Ryan |
| 5,962,076 A | 10/1999 | Mason et al. |

(Continued)

FOREIGN PATENT DOCUMENTS

| AU | 200033838 A1 | 9/2000 |
|---|---|---|
| CA | 2177657 A1 | 5/1996 |

(Continued)

OTHER PUBLICATIONS

International Search Report for corresponding International Application No. PCT/US2020/017864, dated Apr. 23, 2020, 10 pages.

(Continued)

*Primary Examiner* — Nathan L Van Sell
(74) *Attorney, Agent, or Firm* — James Pemrick; Hoffman Warnick LLC

(57) ABSTRACT

Various embodiments include a dense abradable coating, a method of reducing rub damage to a turbine engine part by applying the dense abradable coating thereto, and a turbine engine part having the abradable coating thereon. Particular embodiments include a dense abradable coating including a pore-free metallic composite, a high-aluminum containing brittle alloy, and a plurality of hollow abradable particles.

18 Claims, 2 Drawing Sheets

(56) References Cited

U.S. PATENT DOCUMENTS

| | | | |
|---|---|---|---|
| 6,013,592 A * | 1/2000 | Merrill | C04B 28/34 501/103 |
| 6,235,370 B1 | 5/2001 | Merrill et al. | |
| 6,670,046 B1 | 12/2003 | Xia | |
| 6,916,529 B2 | 7/2005 | Pabla et al. | |
| 9,097,136 B2 | 8/2015 | Chouhan et al. | |
| 9,476,317 B2 | 10/2016 | Chouhan | |
| 9,816,388 B1 | 11/2017 | Kirtley et al. | |
| 10,024,185 B2 | 7/2018 | Lin | |
| 2004/0137259 A1 | 7/2004 | Pabla et al. | |
| 2004/0259713 A1* | 12/2004 | Frey | C03C 3/062 501/33 |
| 2005/0040210 A1 | 2/2005 | Sandin | |
| 2013/0065077 A1 | 3/2013 | Loch et al. | |
| 2015/0375259 A1 | 12/2015 | Lin et al. | |
| 2016/0215646 A1 | 7/2016 | Gonyou et al. | |
| 2017/0274416 A1* | 9/2017 | Yeom | C23C 24/04 |
| 2017/0335708 A1 | 11/2017 | Kray et al. | |
| 2018/0355745 A1 | 12/2018 | Mathew et al. | |
| 2020/0263558 A1 | 8/2020 | Anand et al. | |

FOREIGN PATENT DOCUMENTS

| | | |
|---|---|---|
| CA | 2717827 A1 | 4/2011 |
| CA | 2807060 A1 | 2/2012 |
| EP | 1275748 A2 | 1/2003 |
| EP | 1313932 A2 | 5/2003 |
| EP | 2239422 A2 | 10/2010 |
| EP | 2570676 A2 | 3/2013 |
| EP | 2602043 A1 | 6/2013 |
| GB | 2285632 A | 7/1995 |
| WO | 9521319 | 8/1995 |

OTHER PUBLICATIONS

K Bobzin, et al., "Aktivlotentwicklung auf Basis kommerzieller Nickellote mit Titan oder Zirkon als Aktivelement zum Fugen von Keramik-Metall-Verbunden", Institut fur Oberflachentechnik, Dec. 31, 2009, pp. 161-168.

International Search Report for PCT Application No. PCT/US2020/018046, dated Aug. 27, 2020, 13 pages.

U.S. Appl. No. 16/280,261, Non-Final Office Action dated Nov. 12, 2020, 28 pages.

* cited by examiner

US 11,149,354 B2

DENSE ABRADABLE COATING WITH BRITTLE AND ABRADABLE COMPONENTS

TECHNICAL FIELD

The present disclosure generally relates to dense abradable coatings, methods of reducing rub damage to a turbine engine part by applying the dense abradable coating thereto, and turbine engine parts having the dense abradable coating thereon. The present disclosure more particularly relates to dense abradable coatings including a pore-free metallic composite, a high-aluminum containing brittle alloy, and a plurality of hollow abradable particles.

BACKGROUND

As is convention, abradable materials are used between a moving part and a stationary part in a rotating machine such that one of the parts cuts or rubs a groove into the abradable material. In a gas turbine engine, the abradable material is usually placed on the stationary case (e.g., shroud) and the rotating blades cut/rub a groove into the abradable material. This allows for accommodation of mechanical incursion due to out-of-roundness, rotor sag, thermal growth and blade creep. However, advanced industrial gas turbines typically operate with increased temperatures (e.g., firing temperatures ranging from 2000 to 3300° F.) and with parts (e.g., buckets) having a larger annular area for higher energy output and higher efficiency, as compared to less advanced non-industrial sized gas turbines. Conventional abradable systems, which are typically highly porous, fail to withstand the high temperature, large gas flow and oxidation prone environment of an advanced industrial gas turbine engine, and therefore have limited life expectancy at high temperatures (e.g., as low as 1400° F.).

BRIEF SUMMARY

Dense abradable coatings and methods of reducing rub damage to a turbine engine part by applying the dense abradable coating thereto are disclosed. In a first aspect of the disclosure, an abradable coating includes: a metallic composite, the metallic composite being pore free and including two or more metals selected from iron (Fe), nickel (Ni), aluminum (Al), chromium (Cr), titanium (Ti), yttrium (Y) and cobalt (Co); a brittle alloy, the brittle alloy including at least 20 weight percent of aluminum (Al) and at least one other metal; and a plurality of abradable particles, the plurality of abradable particles including hollow spheres of one or more oxides.

In a second aspect of the disclosure, a method of reducing rub damage to at least one part of a turbine engine includes: applying an abradable coating to a first part of a turbine engine in a location prone to rubbing with a second part of the turbine engine, the abradable coating including a metallic composite, a brittle alloy and a plurality of abradable particles, the metallic composite being pore free and including two or more metals selected from iron (Fe), nickel (Ni), aluminum (Al), chromium (Cr), titanium (Ti), yttrium (Y) and cobalt (Co), the brittle alloy including at least 20 weight percent of aluminum (Al) and at least one other metal, and the plurality of abradable particles including hollow spheres of one or more oxides.

In a third aspect of the disclosure, a turbine engine part having an abradable coating on at least a portion of a surface thereof is provided, wherein the abradable coating includes: a metallic composite, the metallic composite being pore free and including two or more metals selected from iron (Fe), nickel (Ni), aluminum (Al), chromium (Cr), titanium (Ti), yttrium (Y) and cobalt (Co); a brittle alloy, the brittle alloy including at least 20 weight percent of aluminum (Al) and at least one other metal; and a plurality of abradable particles, the plurality of abradable particles including hollow spheres of one or more oxides.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
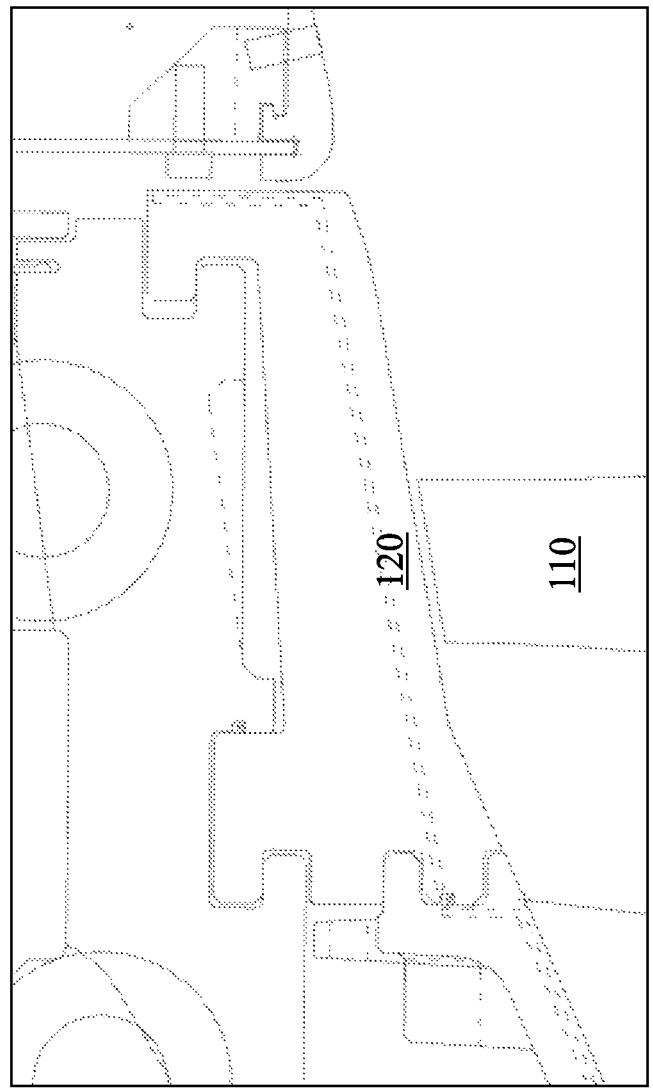
FIG. 1 is a schematic cut-away view of a portion of a gas turbine engine including a blade/bucket in close proximity to a casing/shroud.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

The present disclosure generally relates to dense abradable coatings, methods of reducing rub damage to a turbine engine part by applying the dense abradable coating thereto, and turbine engine parts having the dense abradable coating thereon, and more particularly relates to dense abradable coatings including a pore-free metallic composite, a high-aluminum containing brittle alloy, and a plurality of hollow abradable particles. As noted above, conventional abradable systems, which are typically highly porous, fail to account for the high temperature, large gas flow and oxidation prone environment of an advanced industrial gas turbine engine and therefore have limited life expectancy at temperatures of approximately 1400° F. and above.

Various aspects of the disclosure include an abradable coating including a pore free metallic composite component for lowering porosity, a high aluminum containing brittle alloy component for assisting with oxidation resistance, and a hollow abradable particles component for providing abradability, where each of the components contributes to an improved life expectancy at high temperatures such as 1650° F. and above. Additional aspects of the disclosure include a method of reducing rub damage to part(s) for a turbine engine by applying the noted abradable coating thereto. Accordingly, as compared with conventional approaches, damage (e.g., rub damage) to engine parts can be reduced or prevented by utilizing the coatings of the disclosure that are dense, oxidation resistant, high temperature stable and abradable. In addition, a longer life expectancy of engine parts that utilize the abradable coatings of the disclosure can be attained.

Figure 2:
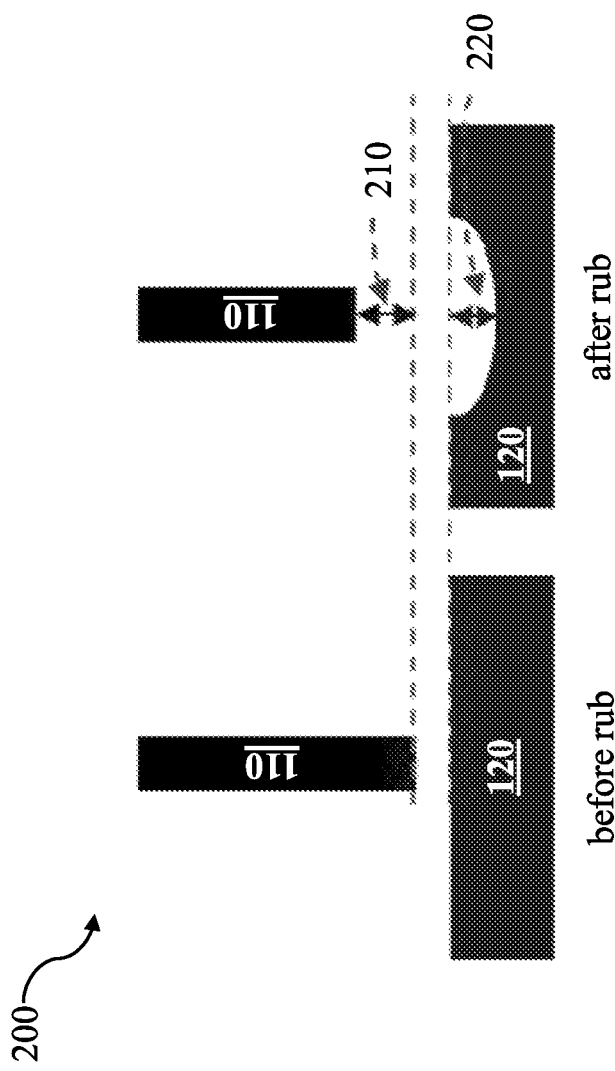
FIG. 2 schematically illustrates blade/bucket wear and casing/shroud cut after rubbing.

FIG. 1 depicts a section of a gas turbine engine 100 including a blade (or bucket tip) 110, configured to rotate about a central (or primary) axis, and a stationary casing section 120 (e.g., a shroud) adjacent the blade 110. Without a means for accommodating thermal growth and blade creep, one or both of blade wearing and shroud cutting can occur—this is schematically depicted in FIG. 2. The left-hand diagram ("before rub") and horizontal dashed lines shown in FIG. 2 depict the clearance between blade 110 and shroud 120 before rubbing and blade wearing/shroud cutting occurs. The right-hand diagram ("after rub") depicts a blade wear gap 210 and a shroud cut 220 after rubbing. As shown in FIG. 2, blade wear gap 210 and shroud cut 220 markedly increase the original clearance (indicated by horizontal dashed lines) between the blade 110 and the shroud 120. This increased clearance can cause unwanted gaps and airflow leakage that can reduce the overall performance of the engine 100 (FIG. 1).

Abradable coatings can be used for clearance control and damage reduction purposes. Conventional abradables are built on a porous coating architecture, and thus typically have high levels of porosity which provide for a desired level of abradability. However, such conventional abradables with high porosity are oxidation prone and have a limited life expectancy above approximately 1400° F.

In aspects of the present disclosure, an abradable coating is provided that can lower porosity and increase oxidation resistance while maintaining sufficient abradability in order to reduce and/or prevent rub damage between engine parts. As such, the abradable coating of the disclosure additionally provides an improved life expectancy at high temperatures such as 1650° F. and above.

The abradable coating of the disclosure includes a metallic composite, a brittle alloy, and a plurality of abradable particles. The metallic composite can have such a low porosity as to be considered pore-free. A pore-free metallic composite in the abradable coating allows for a lower porosity (i.e., denser) coating which aids in longer life expectancy at high temperatures (e.g., approx. 1650° F. and above), as compared with conventional higher porosity coatings when used at the same high temperatures.

The metallic composite can include any two or more metals selected from iron (Fe), nickel (Ni), aluminum (Al), chromium (Cr), titanium (Ti), yttrium (Y) and cobalt (Co). A non-limiting example of the metallic composite includes MCrAlY where M is at least one of Fe, Co and Ni. Where M includes two of Fe, Co and Ni, an example of the metallic composite may include CoNiCrAlY. The abradable coating of the disclosure can include 40 to 60 weight percent (wt %) of the metallic composite, including approximately 50 wt %.

The brittle alloy component of the abradable coating of the disclosure can include a high-aluminum containing alloy. The brittle alloy can contain 20 wt % or more of aluminum (Al). This high content of Al in the brittle alloy can provide a supply of aluminum to the metallic composite as the metallic composite undergoes β-phase depletion during oxidation. Accordingly, the high-aluminum containing brittle alloy present in the abradable coating of the disclosure can enhance the oxidation resistance of the abradable coating of the disclosure.

The brittle alloy includes aluminum as noted above and also at least one other metal—in order to constitute an alloy. The non-aluminum component of the brittle alloy can be one or more metals selected from titanium (Ti), nickel (Ni), cobalt (Co), magnesium (Mg), iron (Fe), tungsten (W), zinc (Zn), manganese (Mn), silicon (Si), chromium (Cr), carbon (C) and beryllium (Be). A non-limiting example of the brittle alloy includes a NiAl alloy. When the brittle alloy is a NiAl alloy, the NiAl alloy may include 20 wt % Al and the remainder Ni. The abradable coating of the disclosure can include 20 to 30 wt % of the brittle alloy, in particular cases 20 wt %.

The abradable particles component of the abradable coating of the disclosure contribute to the abradability of the overall coating which ultimately aids in rub damage reduction/prevention and thus longer life expectancy of engine parts utilizing the coating. The abradable particles can have a particle size within a range of 100 nanometers (nm) to 100 microns (μm). The abradable particles of the coating of the disclosure can include hollow spheres (particles) of one or more oxides. The oxides may be selected from zinc oxide, silicon oxide, aluminum oxide, zirconium oxide, cerium oxide, fly ash (from coal combustion), and hydroxyapatite. A non-limiting example of a hollow oxide includes zinc oxide (ZnO). The abradable coating of the disclosure can include 20 to 30 wt % of a plurality of abradable particles, including approximately 30 wt %. The hollow spheres of one or more oxides may constitute a portion or the entirety of the plurality of abradable particles.

In other aspects of the disclosure, the abradable coating can have a thickness within a range of 120 mils to 200 mils (1 mil=1/1000 of an inch). Such a thickness of the abradable coating of the disclosure can aid in the reduction/prevention of rub damage to an engine part. Additionally, the abradable coatings of the disclosure can be utilized in extended operation at temperatures of approximately 1650 degrees F. or above without undergoing progressive oxidation-based loss of the thickness of the coating, which can further aid in the reduction/prevention of rub damage to an engine part.

In other aspects of the present disclosure, a method is provided for reducing rub damage to at least one part for a turbine engine. The method of the disclosure includes applying the above-discussed abradable coating to a first part for a turbine engine (e.g., casing) in a location prone to rubbing with a second part for a turbine engine (e.g., bucket). The abradable coating can be applied using one or more known coating application techniques so long as the technique selected is capable of maintaining the low porosity (dense) nature of the abradable coating of the disclosure.

Techniques capable of applying the dense abradable coating of the disclosure while maintaining the dense nature of the coating upon completion of application include, but are not limited to, a high velocity oxygen fuel (HVOF) coating process, a low pressure plasma spray (LPPS) coating process, a high velocity plasma spray (HVPS) coating process, a high velocity air fuel (HVAF) coating process, and a suspension thermal sprayed high velocity air fuel (STS-HVAF) coating process. Any one or more of these coating processes may be used. When the abradable coating of the disclosure is applied by a high kinetic energy process such as a HVOF-, HVAF- or HVPS-based coating process, the abradable coating can have a bond strength (with the engine part applied thereto) of 8000 pounds per square inch (psi) or higher. In addition, the coating process selected can be used to apply the coating as a dense monolith or as a pattern, for example a pattern with protruding ridges that may further aid in blade tip loss during rubbing.

As noted above, the abradable coating of the disclosure, when applied to an engine part, can aid in the reduction/prevention of rub damage. Referring back to the right-hand schematic ("after rub") of FIG. 2, blade wear gap 210 and casing cut 220 exist after rubbing and can markedly increase the original clearance (indicated by horizontal dashed lines) between the blade 110 and the casing 120. However, in the instance where the first engine part of the method of the disclosure has the abradable coating applied thereto (e.g., the casing 120) and rubs against the second engine part (e.g., the blade 110), the rub damage to at least the second part can be reduced. More specifically, the rub damage to the second part can be less than 25% of a total incursion depth (of both parts). The total incursion depth is calculated as the sum of the wear depth of the second part (i.e., blade wear gap 210) plus the wear depth of the abradable coated first part (i.e., casing cut 220).

Thus, not only can the abradable coating of the disclosure provide for rub damage/loss that is less than 25% of the total incursion depth in the event of rubbing, but the abradable coating is also capable of extended operation at high temperatures (e.g., approx. 1650° F. and above) and without undergoing progressive coating-thickness loss due to oxidation.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s). "Substantially" refers to largely, for the most part, entirely specified or any slight deviation which provides the same technical benefits of the disclosure.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

We claim:

1. An abradable coating comprising:
a metallic composite, the metallic composite being pore free and including two or more metals selected from iron (Fe), nickel (Ni), aluminum (Al), chromium (Cr), titanium (Ti), yttrium (Y) and cobalt (Co);
a brittle alloy, the brittle alloy including at least 20 weight percent of aluminum (Al) and at least one other metal, wherein the abradable coating includes 20 to 30 weight percent of the brittle alloy; and
a plurality of abradable particles, the plurality of abradable particles including hollow spheres of one or more oxides, wherein the metallic composite constitutes 40 to 60 weight percent of the abradable coating and includes CoNiCrAlY.

2. The abradable coating of claim 1, wherein the metallic composite includes MCrAlY, where M is at least two of iron (Fe), nickel (Ni) and cobalt (Co).

3. The abradable coating of claim 1, wherein the at least one other metal of the brittle alloy is selected from titanium (Ti), nickel (Ni), cobalt (Co), magnesium (Mg), iron (Fe), tungsten (W), zinc (Zn), manganese (Mn), silicon (Si), chromium (Cr), carbon (C) and beryllium (Be).

4. The abradable coating of claim 1, wherein the brittle alloy constitutes 20 to 30 weight percent of the abradable coating and includes nickel (Ni).

5. The abradable coating of claim 1, wherein the one or more oxides of the plurality of abradable particles are selected from zinc oxide, silicon oxide, aluminum oxide, zirconium oxide, cerium oxide, fly ash, and hydroxyapatite.

6. The abradable coating of claim 1, wherein the plurality of abradable particles constitute 20 to 30 weight percent of the abradable coating and have a particle size within a range of 100 nanometers (nm) to 100 microns (μm).

7. The abradable coating of claim 1, comprising:
approximately 50 weight percent of CoNiCrAlY as the metallic composite,
approximately 20 weight percent of $NiAl_{20\%}$ as the brittle alloy, and
approximately 30 weight percent of hollow ZnO particles as the plurality of abradable particles.

8. The abradable coating of claim 1, wherein a thickness of the coating is within a range of 120 mils to 200 mils.

9. The abradable coating of claim 1, wherein the coating is monolithic or patterned.

10. A method of reducing rub damage to at least one part of a turbine engine, the method comprising:
applying an abradable coating according to claim 1 to a first part of a turbine engine in a location prone to rubbing with a second part of the turbine engine.

11. The method of claim 10, wherein the applying of the abradable coating includes at least one of a high velocity oxygen fuel (HVOF) coating process, a low pressure plasma spray (LPPS) coating process, a high velocity plasma spray (HVPS) coating process, a high velocity air fuel (HVAF) coating process, and a suspension thermal sprayed high velocity air fuel (STS-HVAF) coating process.

12. The method of claim 10, wherein
the metallic composite includes MCrAlY, where M is at least two of iron (Fe), nickel (Ni) and cobalt (Co);
the at least one other metal of the brittle alloy is selected from titanium (Ti), nickel (Ni), cobalt (Co), magnesium (Mg), iron (Fe), tungsten (W), zinc (Zn), manganese (Mn), silicon (Si), chromium (Cr), carbon (C) and beryllium (Be); and
the one or more oxides of the plurality of abradable particles are selected from zinc oxide, silicon oxide, aluminum oxide, zirconium oxide, cerium oxide, fly ash, and hydroxyapatite.

13. The method of claim 10, wherein the plurality of abradable particles have a particle size within a range of 100 nanometers (nm) to 100 microns (μm).

14. The method of claim 10, wherein the abradable coating comprises:
the metallic composite including 40 to 60 weight percent of MCrAlY, where M is at least two of iron (Fe), nickel (Ni) and cobalt (Co);

the brittle alloy including 20 to 30 weight percent of NiAl, where NiAl includes at least 20 weight percent of aluminum (Al); and the plurality of abradable particles including 20 to 30 weight percent, where hollow zinc oxide is one of the one or more oxides.

15. The method of claim 10, wherein applying the abradable coating applies the abradable coating with a thickness within a range of 120 mils to 200 mils and with a bond strength of 8000 pounds per square inch (psi) or greater.

16. The method of claim 10, wherein applying the abradable coating applies the abradable coating at a thickness so rub damage to the second part for a turbine engine is less than 25% of a total incursion depth, the total incursion depth being the sum of a wear depth of the second part and a wear depth of the abradable coated first part.

17. A turbine engine part having an abradable coating according to claim 1 on at least a portion of a surface thereof, the abradable coating comprising:

metallic composite including 40 to 60 weight percent of MCrAlY, where M is at least two of iron (Fe), nickel (Ni) and cobalt (Co);

brittle alloy including 20 to 30 weight percent of NiAl, where NiAl includes at least 20 weight percent of aluminum (Al); and the plurality of abradable particles including 20 to 30 weight percent, where the plurality of abradable particles have a particle size within a range of 100 nanometers (nm) to 100 microns (μm), and where hollow zinc oxide is one of the one or more oxides of the plurality of abradable particles.

18. The turbine engine part of claim 17, wherein the abradable coating has a thickness within a range of 120 mils to 200 mils and a bond strength with the turbine engine part of 8000 pounds per square inch (psi) or greater.

* * * * *